June 29, 1965     J. EDWARDS     3,191,656
PORTABLE TIRE SEAL BREAKER
Filed July 27, 1964
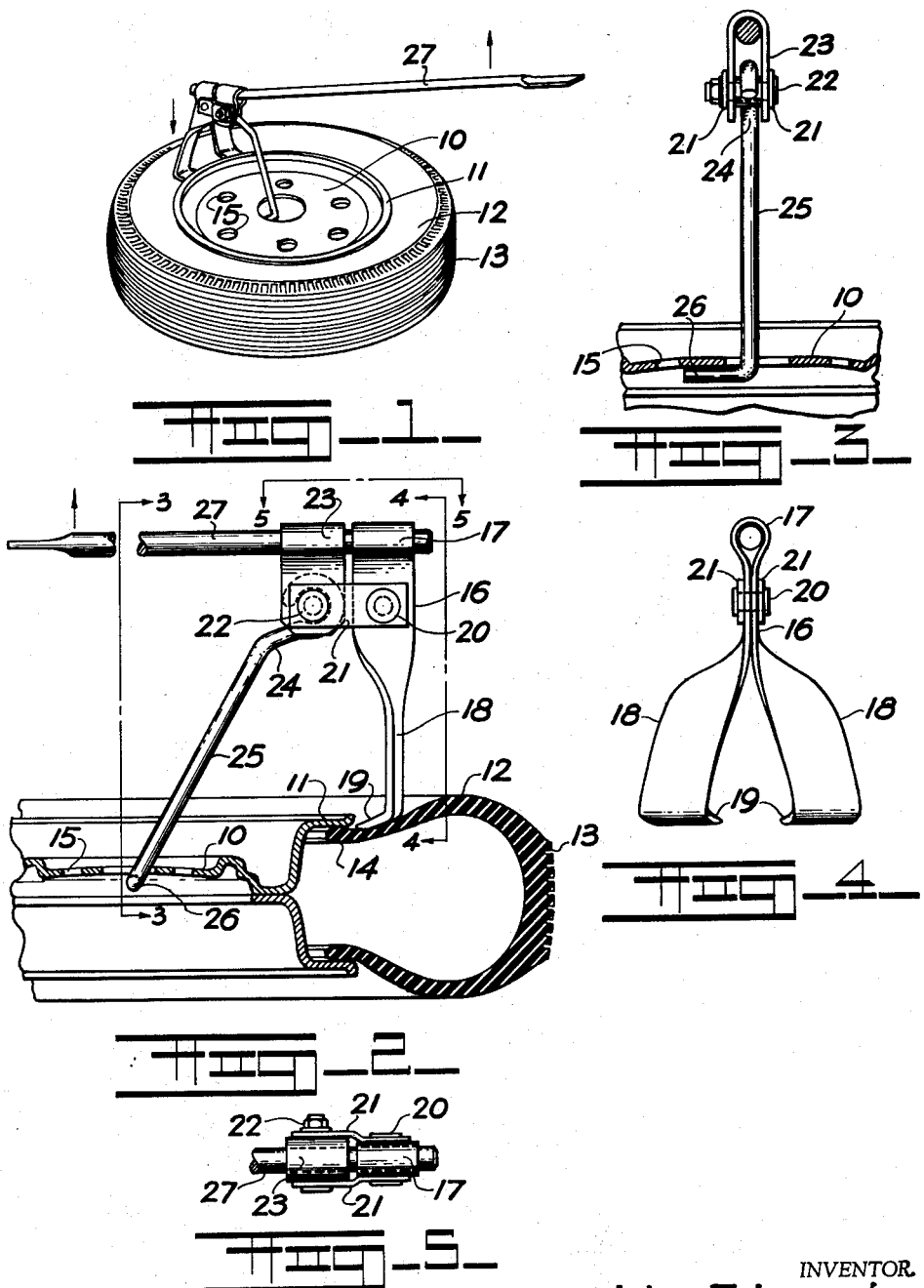
INVENTOR.
John Edwards
BY
*W. B. Harpman*
ATTORNEY.

United States Patent Office 3,191,656
Patented June 29, 1965

3,191,656
PORTABLE TIRE SEAL BREAKER
John Edwards, 4595 Bonnie Drive SW., Rte. 1,
Warren, Ohio
Filed July 27, 1964, Ser. No. 385,344
4 Claims. (Cl. 157—1.17)

This invention relates to tire tools and more particularly to tools capable of being used to free a pneumatic tire from a wheel on which the same has been mounted.

The principal object of the invention is the provision of a portable tire seal breaker tool that may be assembled and applied to an automobile wheel and used to free the bead of the pneumatic tire therefrom so that the tire can be removed from the wheel.

A further object of the invention is the provision of a simple, inexpensive, light-weight portable tire seal breaker tool.

A still further object of the invention is the provision of a light-weight tire tool that may be quickly and easily used on a wheel and tire combination to free the bead of the tire from the rim of the wheel so that the tire can be removed therefrom.

A still further object of the invention is the provision of a light-weight inexpensive portable tire seal breaker tool that may be manufactured on inexpensive machinery at low cost and used by anyone without any particular skill in freeing a tire, such as a tubeless tire, from a wheel having an integral rim construction.

The portable tire seal breaker tool disclosed herein comprises an improvement in the art of such tire tools in that heretofore such tools as existed comprised relatively heavy, fixed commercial devices upon which a wheel and tire were mounted and manipulated so as to free the bead of the tire from its sealing relation with the rim of the wheel. These devices are generally found in the tire repair stations and new tire sales outlets and the like. Heretofore, there has been no tool available to the individual motorist which would enable him to remove a tire from a wheel having an integral rim, and the present invention accomplishes this primary object.

The device is simple and inexpensive in construction and may easily incorporate as its activating lever a pry bar which is also useful as a jack handle.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a tire and wheel and illustrating the portable tire seal breaker tool thereon.

FIGURE 2 is an enlarged cross sectional detail of a portion of a wheel and a pneumatic tire thereon and illustrating the portable tire seal breaker tool in operative relation thereto.

FIGURE 3 is a vertical section on line 3—3 of FIGURE 2.

FIGURE 4 is a vertical section on line 4—4 of FIGURE 2.

FIGURE 5 is a horizontal section on line 5—5 of FIGURE 2.

By referring to the drawings, and FIGURES 1 and 2 in particular, it will be seen that a wheel such as a pressed steel wheel with an integral rim is generally indicated by the numeral 10 with the rim portion thereof carrying the numeral 11. A pneumatic tire having a side wall 12, a tread area 13 and a bead 14 is illustrated in position on the wheel 10 with its integral rim 11. As will be understood by those skilled in the art, the wheel 10 is provided with a number of apertures 15, 15 which serve to engage lugs on the actual wheel of the automobile and receive bolts to secure the wheel thereto in detachable relation.

The portable tire seal breaker tool disclosed herein comprises a bifurcated body member 16 having a looped upper end portion 17 and defining a pair of spaced, spreading downturned arms 18, 18, the ends of which are flanged at 19, 19.

By referring to FIGURES 2 and 4 of the drawings, it will be observed that the bifurcated body member 16 is apertured in the area thereof beneath the looped upper end portion 17 therein and that a rivet 20 is positioned through the aperture so as to secure a pair of horizontally disposed straps 21, 21 thereto. The straps 21, 21 are apertured at horizontally spaced locations, one of which receives the rivet and the other of which receives a secondary fastener comprising a bolt 22. The bolt 22 engages the apertured space downturned ends of a secondary loop member 23 which as best seen in FIGURE 3 of the drawings, provides an area for the reception of a hooked upper end 24 of an arm 25, the lower end of which has an L-shaped configuration 26. The hooked upper end 24 forms an open eyelet, in effect, which may be detachably engaged on the intermediate portion of the bolt 22 where it extends between the spaced downturned arms of the secondary loop member 23.

The lower end of the arm 25, which is L-shaped and indicated by the numeral 26, is adapted to be hooked into one of the openings in the wheel 10, and as shown it is positioned through the hub clearing opening therein so that it secures the arm 25 thereto. A lever 27, which may practically comprise a pry bar or a jack handle, is inserted through the loop 17 of the bifurcated body member 16 and through the loop member 23 as best seen in FIGURE 2 of the drawings.

It will thus be observed that by moving the outer free end of the lever 27 upwardly the device will fulcrum on the bolt 22 which is fixed to the wheel 10 so that the depending arms 18 of the bifurcated member 16 will push downwardly and forceably engage their flanges 19, 19 on the tire side wall 12 adjacent the bead 14 so as to push it down and free it from the rim 11 of the wheel 10.

It will be understood by those skilled in the art that once a portion of the bead 14 of the pneumatic tire has been freed from the rim 11 of the wheel, the tool is then moved circumferentially and the operation repeated to completely free the bead of the tire therefrom. This is easily accomplished with the tool despite the fact that the sealant compound ordinarily used with tubeless tires frequently causes a very secure adhesion between the bead 14 of the tire and the rim 11, as will be understood by those skilled in the art.

It will thus be seen that a portable tire seal breaker tool has been disclosed which may be simply and efficiently used to free the bead of a pneumatic tire from the rim of a wheel on which it is mounted so that the tire may be removed therefrom as for repair or replacement. It will thus be observed that the tool thus disclosed meets the several objects of the invention, and having thus disclosed my invention, what I claim is:

1. A portable tire seal breaker tool comprising a bifurcated body member having spaced portions arranged to engage a tire on a wheel adjacent the bead thereof, a secondary body member spaced with respect to the bifurcated member, said bifurcated body member and secondary body member having lever receiving configurations, means interconnecting the bifurcated body member and the secondary body member in pivotal arrangement, and an arm connected with said secondary body member and having a configuration on its free end engagable with said wheel and arranged to hold said tool relative to said wheel, a lever for engagement with said lever receiving formations on said bifurcated body member and said secondary body member whereby said bifurcated body member may be moved relative to said secondary body member.

2. The portable tire seal breaker tool set forth in claim 1 and wherein said spaced portions of said bifurcated body member comprise depending spaced arms with flanged lower ends adapted to engage said tire adjacent the bead thereof.

3. The portable tire seal breaker tool set forth in claim 1 and wherein the lever receiving configurations on said bifurcated body member and said secondary body member comprises looped portions thereof arranged on a common axis.

4. The portable tire seal breaker tool set forth in claim 1 and wherein said arm has an open eyelet configuration engaged in said secondary body member in the detachable manner.

No references cited.

GRANVILLE Y. CUSTER, Jr., *Primary Examiner.*